Sept. 4, 1923.
R. F. BOWER
1,466,689
ROLLER BEARING CAGE
Filed Nov. 14, 1921
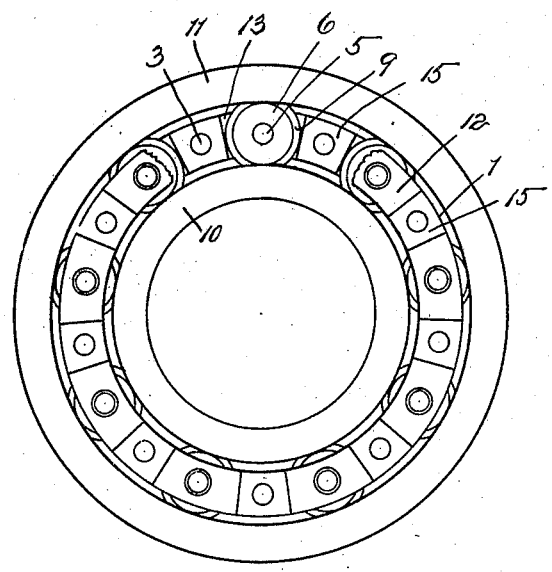
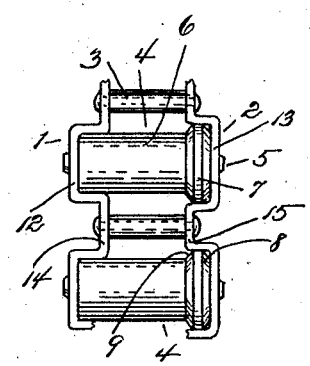
Inventor
Robert F. Bower
By Whittemore Hulbert Whittemore
 Belknap    Attorneys Patented Sept. 4, 1923.

1,466,689

UNITED STATES PATENT OFFICE.

ROBERT F. BOWER, OF DETROIT, MICHIGAN, ASSIGNOR TO BOWER ROLLER BEARING COMPANY, OF DETROIT, MICHIGAN, A CORPORATION OF MICHIGAN.

ROLLER-BEARING CAGE.

Application filed November 14, 1921. Serial No. 514,843.

*To all whom it may concern:*

Be it known that I, ROBERT F. BOWER, a citizen of the United States of America, residing at Detroit, in the county of Wayne and State of Michigan, have invented certain new and useful Improvements in Roller-Bearing Cages, of which the following is a specification, reference being had therein to the accompanying drawings.

The invention relates to roller bearing cages and has for its object the provision of means engageable with the rolls for relatively short portions of their length to space the same, the remaining portions of the rolls being freely exposed so that lubricant may readily reach the same. With this object in view, the invention resides in the novel features of construction as more fully hereinafter set forth.

In the drawings:

Figure 1 is an end elevation partly broken away, of a roller bearing unit embodying my invention;

Figure 2 is a side elevation of a portion thereof.

1 and 2 are heads of the cage held in spaced relation by means of the shouldered tie bars 3 extending therebetween. 4 are the rolls having the pivot portions 5 extending through apertures of slightly greater diameter in the heads 1 and 2 so that the rolls are freely movable through limited distances relative to the heads. Each roll has the main cylindrical portion 6 and the enlargement 7 at one end with the oppositely inclined bearing portions 8 and 9 for taking care of end thrust in opposite directions. The bearing surfaces of the rolls are adapted to engage corresponding bearing surfaces in the inner and outer race members 10 and 11 respectively.

To hold the rolls in proper spaced relation, the heads 1 and 2 are of zig-zag shape so that they have the portions 12 and 13 respectively which embrace the ends of the rolls and the portions 14 and 15 respectively intermediate the ends of the rolls which are connected by the shouldered tie bars 3. These tie bars are spaced from the rolls to expose their surfaces so that lubricant may freely reach the same.

It will be readily seen that I have devised a novel and simple form of roller bearing cage in which the heads are zig-zag and have portions for embracing the ends of the rolls to space the same, the intermediate portions of the rolls being exposed to permit of lubricant readily reaching the same.

What I claim as my invention is:

1. In a roller bearing cage, the combination with spaced heads and rolls extending therebetween, of tie bars extending therebetween, and means integral with said heads for engaging relatively short portions of the rolls to space the same.

2. In a roller bearing cage, the combination with spaced heads, of tie bars extending therebetween, and means integral with said heads for engaging the ends only of the rolls to space the same.

3. In a roller bearing cage, the combination with a pair of zig-zag heads, of tie bars extending therebetween intermediate the rolls, said heads having portions embracing the ends only of said rolls.

4. In a roller bearing cage, the combination with a pair of zig-zag heads having portions embracing the ends only of the rolls, of means intermediate the rolls and engaging the heads to hold the same in spaced relation.

5. In a roller bearing cage, the combination of spaced heads having pressed out portions for receiving the rolls and aligning the same in spaced relation, and tie bars extending between said heads intermediate said pressed out portions.

6. In a roller bearing cage, the combination of spaced heads having pressed out portions for receiving the rolls and aligning the same in spaced relation, and tie bars extending between said heads.

In testimony whereof I affix my signature.

ROBERT F. BOWER.